United States Patent
Paget et al.

(10) Patent No.: US 10,891,477 B2
(45) Date of Patent: Jan. 12, 2021

(54) AUTOMATIC NOTE REFINEMENT, DATA CAPTURE, AND EXPORT

(71) Applicant: JPMorgan Chase Bank, N.A., New York, NY (US)

(72) Inventors: Helen Paget, Bournemouth (GB); Shawn Wesley Alexander, Pearland, TX (US); Pankaj Singh, Bournemouth (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 177 days.

(21) Appl. No.: 16/033,697

(22) Filed: Jul. 12, 2018

(65) Prior Publication Data

US 2020/0019771 A1    Jan. 16, 2020

(51) Int. Cl.
*G06K 9/00* (2006.01)
*H04L 12/58* (2006.01)
*G06F 40/289* (2020.01)

(52) U.S. Cl.
CPC ....... *G06K 9/00469* (2013.01); *G06F 40/289* (2020.01); *H04L 51/10* (2013.01); *G06K 2209/01* (2013.01)

(58) Field of Classification Search
CPC ............ G06K 9/00469; G06K 2209/01; G06F 40/289; H04L 51/10
See application file for complete search history.

(56) References Cited

U.S. PATENT DOCUMENTS

| 2013/0315441 A1* | 11/2013 | Blose | G06K 9/72 382/103 |
| 2013/0315485 A1* | 11/2013 | Blose | G06F 40/194 382/182 |
| 2018/0285321 A1* | 10/2018 | Antony | G06K 9/723 |

* cited by examiner

*Primary Examiner* — Leon Flores
(74) *Attorney, Agent, or Firm* — Greenberg Traurig LLP

(57) ABSTRACT

A system for capturing, using a digital camera, a Scrum board note and processing the image of the note to extract textual content of the note for use by a collaboration and project management application program. The processing of the image includes removing image imperfections and formatting the image such that it is optimized for scanning, thereby reducing spelling or scanning errors.

16 Claims, 6 Drawing Sheets

AUTOMATIC NOTE REFINEMENT, DATA CAPTURE, AND EXPORT

TECHNICAL FIELD

The present invention relates generally to methods of and systems for gathering data generated in a non-digital format, converting the data from a non-digital format into a digital format, and inputting the converted data into a software application. The invention is useful to capture text notes and is particularly applicable for use in project tracking and management.

BACKGROUND

The Agile Scrum software development process is an iterative process that involves recurring stand-up meetings (Scrum) during which development team members meet to disclose development progress. During these stand-up meetings, members of the development team disclose the work they performed since the last Scrum, the work that they intend to perform prior to the next Scrum, and any roadblocks that they have encountered. These disclosures are captured on a white board or using Post-It® or similar notecards. Software tools are frequently used to track and preserve these disclosures. A known method of providing the disclosure information to these software programs involves manually keying in the information from each notecard or otherwise on the whiteboard. In addition to Scrums, there may also be Requirements Gathering, Sprint, and Roadmap Planning ceremonies in which handwritten notes are produced.

In each case, the generated notes must be preserved and tracked. The preservation and tracking of the notes can be costly due to the time involved to manually enter the data. Additionally, the manual entry of the information is subject to errors as the result of mistyped entries. Such errors can result in confusion and lost time to the development team. Another known method of capturing requirements and Scrum data involves the use of a computerized or smart whiteboard. These whiteboard devices can capture the information from Scrums by sensing the content entered by development team members. Such devices generally are not able to read data entered onto notecards and frequently require that the content be entered directly on the whiteboard surface. These requirements limit the ability to rearrange notecards on the whiteboard surface during the Scrum. In addition to limiting the ability to rearrange notecards, these computerized whiteboards can be costly and require that the Scrums be held in a meeting area which has been configured with the computerized whiteboard device. In order to avoid the errors introduced by manual processes and the costs involved in both manual capture and capture using a smart whiteboard, a system for and method of capturing meeting related information (e.g., Requirements, Sprint, Roadmap planning, and/or Scrum meeting notes) automatically without the requirement of a computerized whiteboard is needed.

SUMMARY

The general inventive concepts encompass a system for and method of capturing meeting related information (e.g., Requirements, Sprint, Roadmap planning, and/or Scrum meeting notes) (herein, generally referred to as "notes") utilizing an image capture device to generate an image of the captured notes from the image capture device, and software instructions that process the image to convert notes in the image into text. In addition to other uses, the invention may be used to provide the captured information to a software program that stores those notes for communication to other stakeholders and for the purposes of archiving.

In an exemplary embodiment, a person responsible for capturing notes uses an image capture device to capture an image of a whiteboard or other medium on which tasks and story statuses have been arranged. The captured image or images are received by a computer processor which executes software instructions that extract tasks and other information from the captured image or images. The computer processor executes further software instructions that provide the extracted tasks and story statuses to a collaboration and project management computer program such as Jira (available from Atlassian of Sydney, Australia).

The above and other aspects and advantages of the general inventive concepts will become more readily apparent from the following description and figures, illustrating by way of example the principles of the general inventive concepts.

BRIEF DESCRIPTION OF THE DRAWINGS

These and other features of the general inventive concepts will become better understood with regard to the following description and accompanying drawings in which.

DETAILED DESCRIPTION

There are various methods of software development, but iterative development methods are extremely popular due to their flexible approach to meeting the needs of a software development client. One popular iterative development method is the Agile development method. There are many variants to the Agile development method, including requirements gathering, Sprints, Roadmap Planning meetings, and daily status meetings referred to as Scrums. The word scrum is a reference to the process of restarting play used in the game of rugby. As used in reference to the Agile development process, Scrum refers to brief, recurring project meetings, generally held each day, in which developers associated with a particular project meet to disclose their activities since the last meeting. During a Scrum, the emphasis is on communication between the various members of the team. A primary method of capturing this communication is the Scrum board. The Scrum board is a place (e.g., a white board) upon which notes are placed in order to provide information regarding a particular project related activity. Requirements gathering, Sprints, and Roadmap planning meetings associated with software development which may also use a white board to collect notes from the meeting participants. The discussion that follows describes the use of exemplary embodiments to collect notes from Scrums but it will be understood by one ordinarily skilled in that art that the invention is equally applicable to other types of meetings, and similar situations in which notes are generated to capture project and other information.

Figure 1:
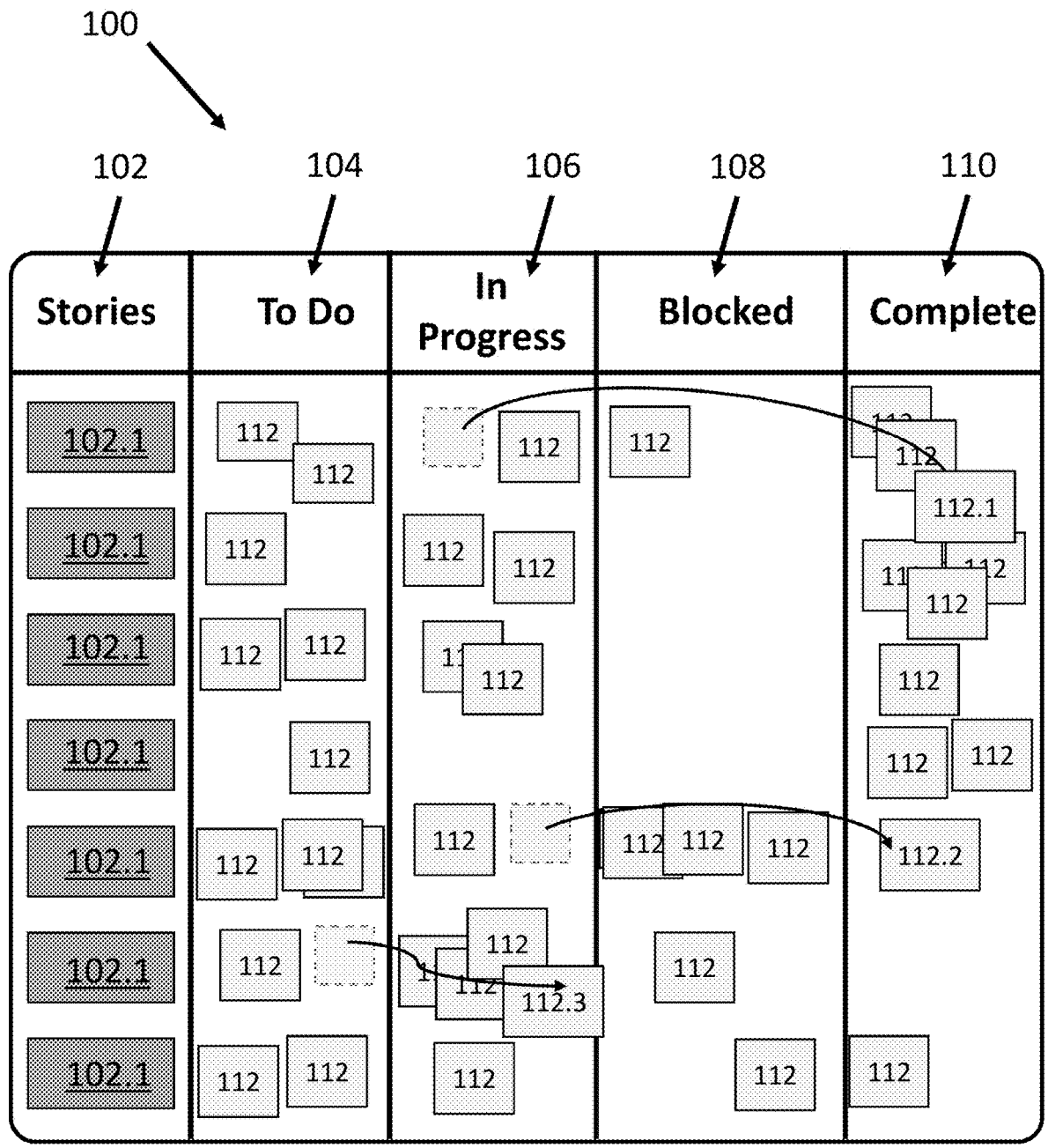
FIG. 1 is a diagram illustrating an exemplary Scrum board used in a Scrum software development process.

Each major project task is listed on the Scrum board and is generally referred to as a story. Each story may have a number of associated tasks. The Scrum board is thus a collection of notes that provide information about the various stories and task items associated with the story. A common approach is to write these notes on Post-It® or similar types of repositionable notecards and place them in position on the Scrum board. An example of a Scrum board is illustrated in FIG. 1. As is shown, the Scrum board 100 may be divided into columns which comprise the name of the story 102, story items to be completed 104, story items that are in-progress 106, story items that are blocked 108, and story items that are complete 110. Notes 112 that are related to the status of each story are placed on the Scrum board 100 during each Scrum meeting. As work on the development progresses, the content of these notes 112 is frequently updated. For example, at each Scrum, the notes 112 are updated or moved on the Scrum Board 100 to illustrate the current status of each task of the various stories and thus the status of the development as a whole.

Known methods of capturing and storing the information contained on the Scrum board 100 include manually recording the information from each note and entering that information into a record keeping system. Because Scrums typically take place frequently, and there may be a number of stories associated with a particular development project, the number of notes placed on the Scrum board 100 can be significant. The process of manually recording these notes for entry into a record keeping system can thus be very time consuming. Additionally, with the manual entry of information, there is the possibility of errors.

Figure 2:
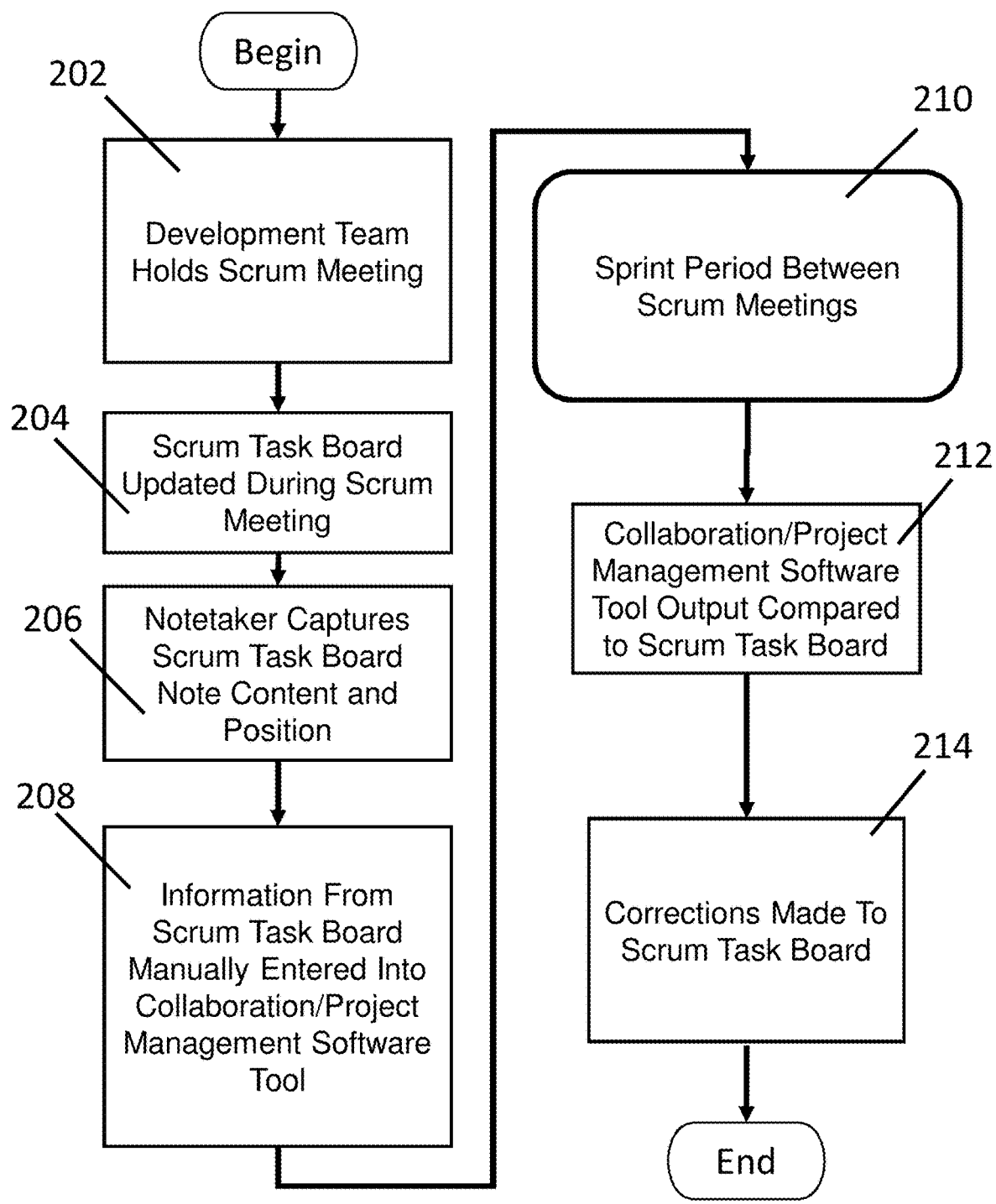
FIG. 2 is a flowchart illustrating the steps taken by known methods of tracking a Scrum software development process.

FIG. 2 illustrates the steps involved in capturing the information from the new or changed notes that result from a typical Scrum according to known methods. Step 202 represents a Scrum in which a disclosure is provided by developers. This disclosure represents the current status of each story that developers are responsible for completing or tracking. In step 204, new notecards representing newly identified tasks are placed on a Scrum board 100 and existing notes are updated or moved from column to column on the Scrum board according to their status. In step 206, a notetaker records the information from each notecard and its relative position on the Scrum board 100. The notetaker or other person then takes the recorded information and stores it into project management or collaboration software in step 208. During the sprint period between Scrums (step 210), the developers work towards the completion of tasks associated with the various stories. As is illustrated in step 212, prior to the start of each Scrum, the notetaker or other person confirms that the Scrum board is accurate with regard to what was stored after the previous Scrum. If there are inaccuracies, the Scrum board 100 is updated in step 214 such that it reflects the current state of the various stories that make up the project.

Figure 3:
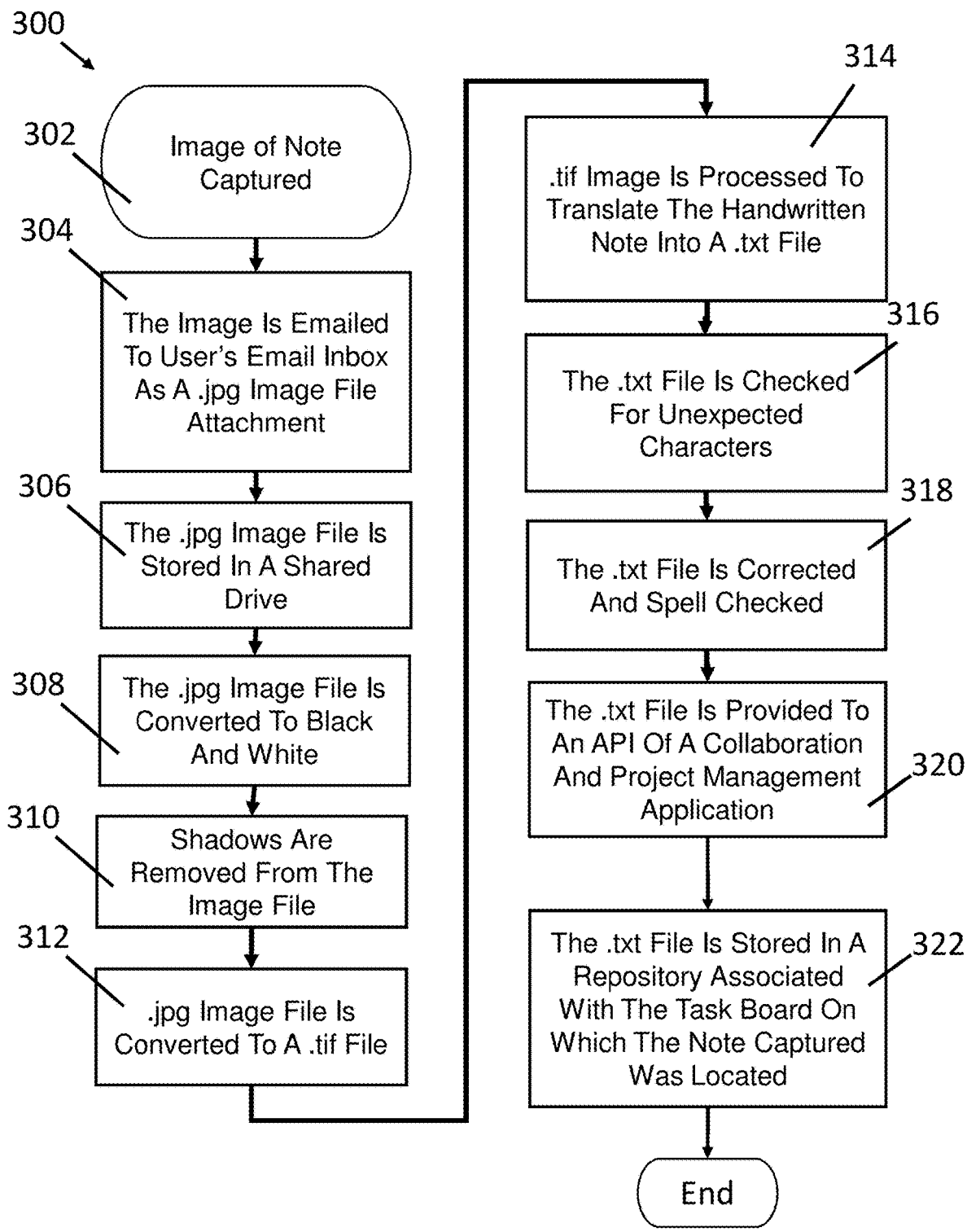
FIG. 3 is a flow chart of the steps taken to capture and store the content of a note according to an exemplary embodiment.
Figure 4:
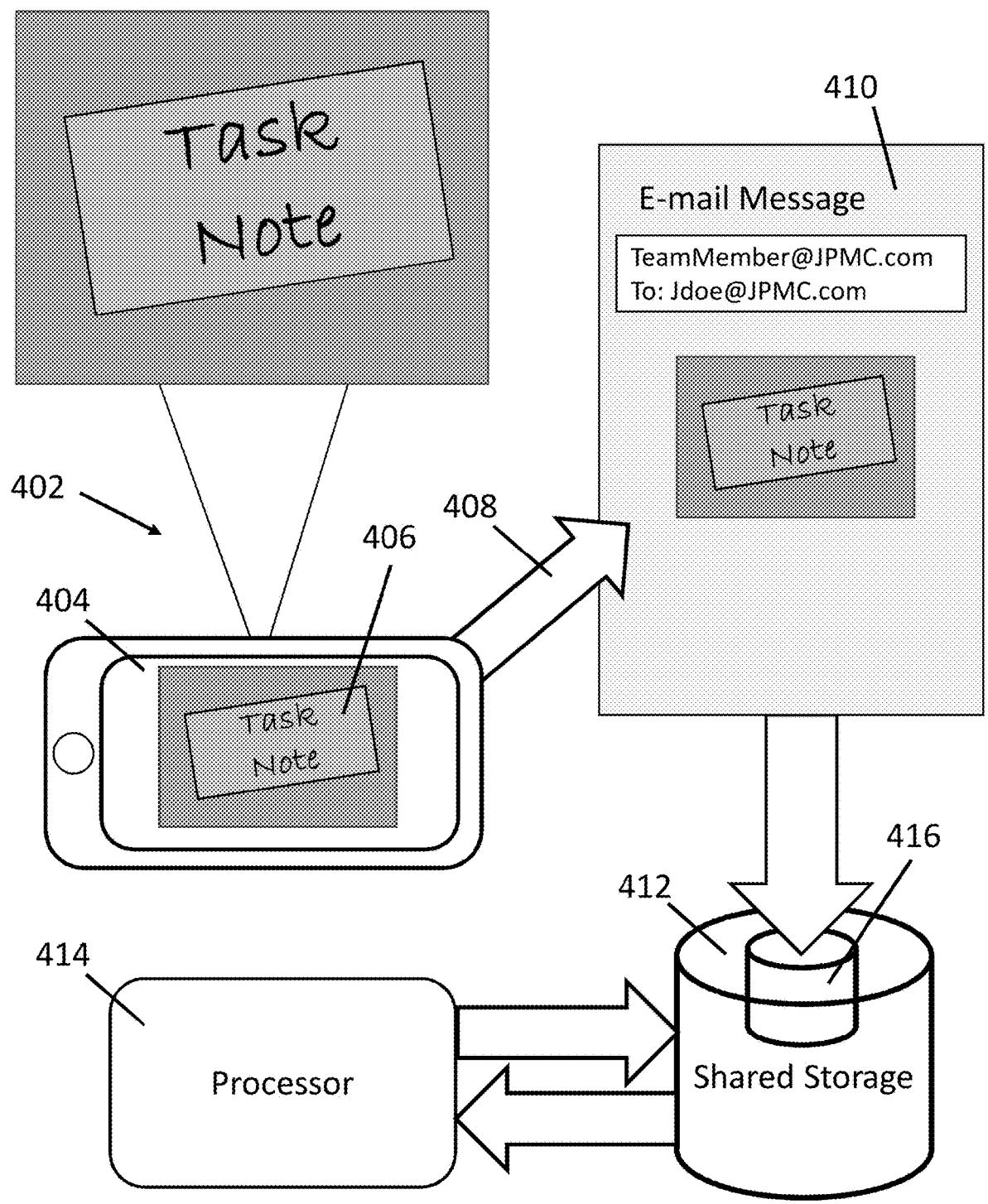
FIG. 4 is a diagram of a system for capturing the notes and storing them according to an exemplary embodiment.

In order to capture the information available on the various notes that make up a Scrum board 100, an exemplary embodiment facilitates the capture of images of the various notes and the conversion of those images into text files. FIG. 3 illustrates a flow chart 300 of the steps which are comprised by an embodiment of the invention. In step 302, an image of a single task note is captured. This is illustrated in the diagram of FIG. 4 at 402. A smartphone 404 is shown, but embodiments of the invention may use other image capture devices. Examples include, without limitation, digital cameras, tablet computers, laptop computers, wireless cameras, and cameras that may be included into audio conferencing systems. In step 304, the captured image 406 is e-mailed to an inbox as an attachment to an email. This is illustrated at 408 and 410 of FIG. 4. In an exemplary embodiment, this inbox could be a dedicated inbox that is polled by a download polling function. In step 306, the image 406 is stored in a shared drive 412. As is illustrated, a processor 414 is in electronic communication with the shared drive 412. This is also illustrated in the exemplary embodiment of FIG. 5 at 500. As is shown, the processor 414 includes or is otherwise interfaced with at least one microprocessor 502, a memory 504, a first interface 506, and a second interface 508. The microprocessor 502 executes software instructions from the memory 504, which perform or call external functions, which perform the functions illustrated in the remaining steps of FIG. 3. A copy of the captured image 406 is retrieved from the shared drive 412 and processed to correct any image distortion or rotation that may have occurred during the image capture process 302. This processing is illustrated in FIG. 6 at 600. The processed image 602 is then converted to a black and white image in step 308 as illustrated at 604. In addition to the black and white conversion of step 308, the image 602 may also be processed in step 310 to remove shadows, glare, out of focus portions, and other image imperfections that might make it difficult to extract text information from the image.

In order to facilitate text recognition, the processed image 604 is converted to a .tiff file in step 312. In certain embodiments, this conversion improves the performance and accuracy of the character recognition performed on the processed image in later steps. The converted file 604.1 is then processed in step 314 to convert text found in the file into a .txt (text) file 606. In certain embodiments, the conversion is performed by a conversion algorithm that is external to the processor 414. In such embodiments, access to the converted file 602.1 is provided to the conversion algorithm via an application program interface (API). In other embodiments, the processing is performed by algorithms that are performed by the processor 414 directly on the converted file 602.1. In certain exemplary embodiments, processing is provided by Tesseract optical character recognition software (Tesseract is an open-source software program for which development was sponsored by Google®). In an exemplary embodiment, the text file 606 is then checked for unexpected characters in step 316. This check provides an indication of whether the process of step 314 was successful. In step 318, the text file 606 is checked for spelling errors and corrected.

Figure 5:
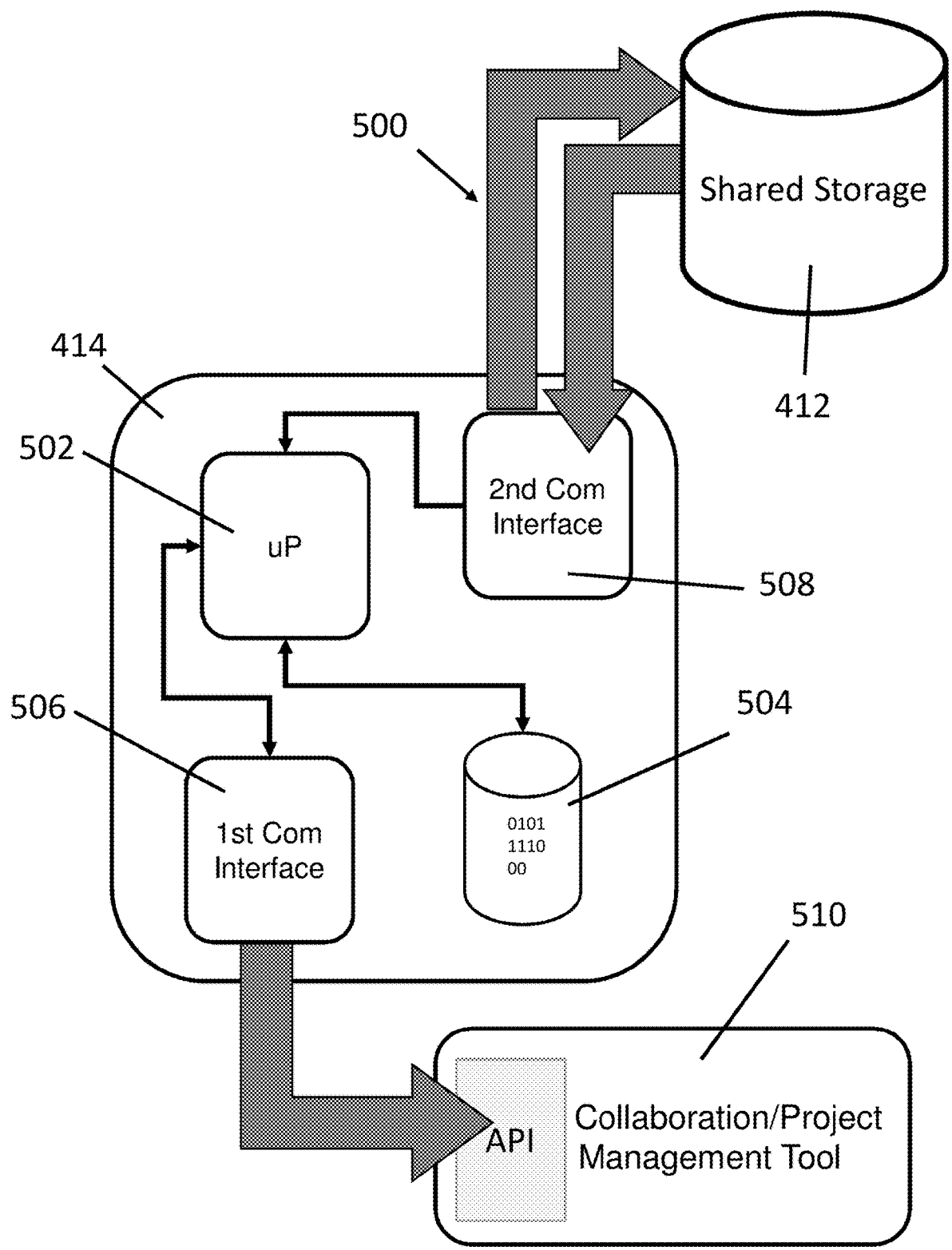
FIG. 5 is a diagram of a processor according to an exemplary embodiment.
Figure 6:
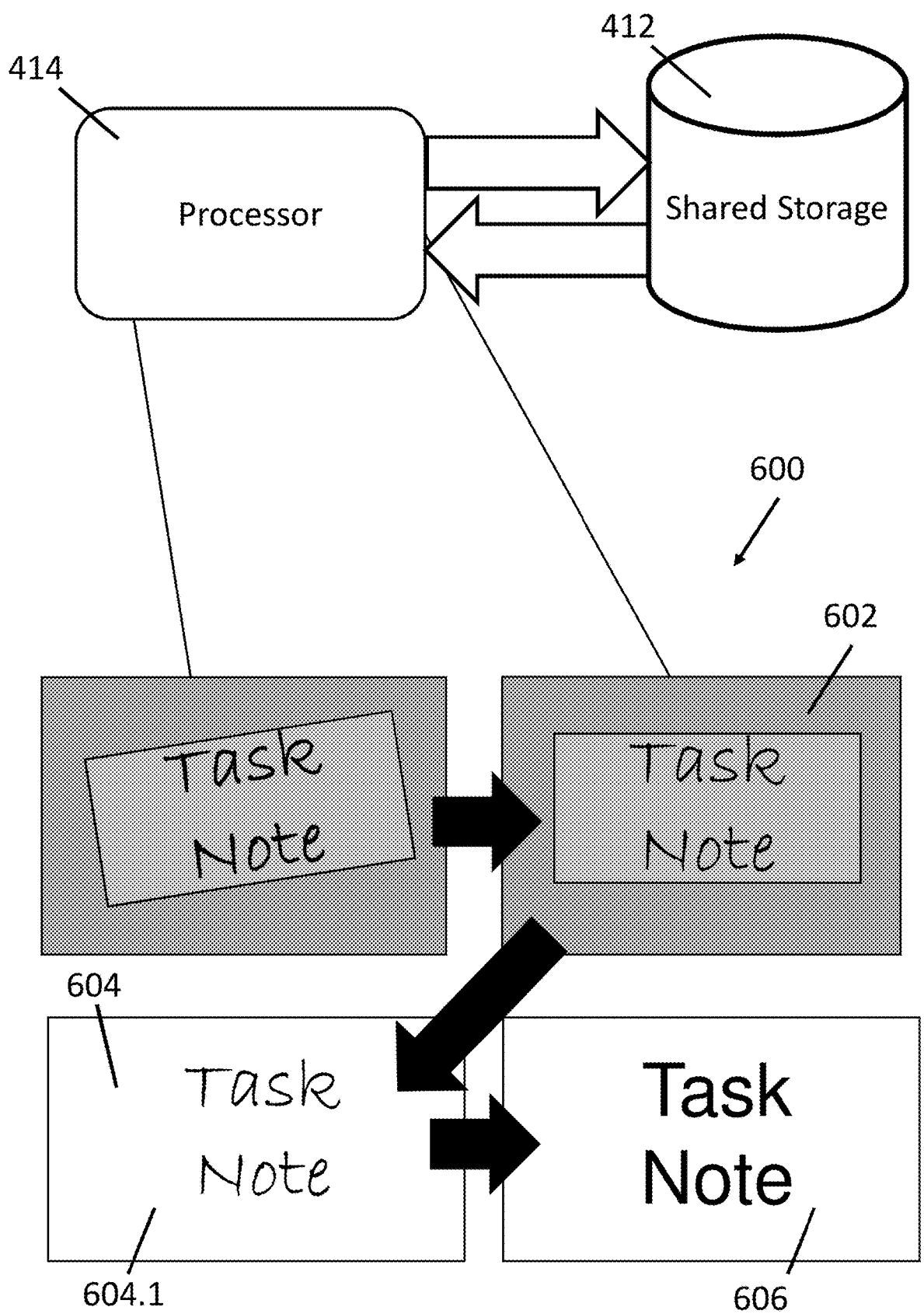
FIG. 6 is a diagram of operations performed on the image by an exemplary embodiment.

In step 320, according to an exemplary embodiment, the text file 606 is provided to a collaboration and project management application 510 as is illustrated in FIG. 5. In such an embodiment, the text file 606 is provided using an API. However, in other embodiments, the file may be placed in the shared storage location 412 where it is accessed by the collaboration and project management application program 510.

In certain exemplary embodiments, step 320 may result in the determination of a second storage location in a repository 416 associated with the project management application program. The repository 416 is used to store the text file 606 into a second storage location associated with a particular project. Once the proper storage location is determined, the text file is posted to the repository in step 322. In certain exemplary embodiments, such a repository 416 is maintained in the shared storage location 412 as illustrated in FIG. 4.

While the present invention and associated inventive concepts have been illustrated by the description of various embodiments thereof, and while these embodiments have been described in considerable detail, it is not the intention of the Applicant to restrict or in any way limit the scope of the appended claims to such detail. Additional advantages and modifications will readily appear to those skilled in the art. Moreover, in some instances, elements described with one embodiment may be readily adapted for use with other embodiments. Therefore, the invention, in its broader aspects, is not limited to the specific details, the representative apparatus, and illustrative examples shown and described. Accordingly, departures may be made from such details without departing from the spirit or scope of the general inventive concepts.

What is claimed is:

1. A system for capturing textual content of notecards, the system comprising: a processor; a shared storage device in communication with the processor; a memory in electronic communication with the processor, the memory comprising software instructions, which, when executed, cause the processor to: receive, from a digital imaging device, a digital image of a notecard that is associated with a story item status in a software development cycle comprising one or more of a story item name, a story item to be completed, a story item that is in progress, a story item that is blocked, or a story item that is complete, the digital image comprising handwritten text; store the digital image in the shared storage device as an image file; process the digital image to improve the handwritten text present in the digital image; extract the handwritten text from the digital image;

store the handwritten text as a text file; associate the text file with the story item status for the digital image; and transmit the text file and the associated story item status to a collaboration and project management software application.

2. The system of claim 1, wherein the digital image is received by email.

3. The system of claim 1, wherein the handwritten text present it the digital image is improved by: aligning the digital image such that the handwritten text found in the image is oriented primarily parallel with regard to a boundary of the image; and converting the digital image into a black and white format.

4. The system of claim 3, further comprising processing the converted digital image to remove image imperfections.

5. The system of claim 4, wherein the image imperfections comprise shadows, reflections, glare, and out of focus portions.

6. The system of claim 1, wherein the handwritten text is extracted from the digital image by: transmitting the digital image to a text recognition application; and receiving the text file from the text recognition application that corresponds to the transmitted digital image.

7. The system of claim 1, wherein the software instructions further comprise instructions to receive a second digital image that comprises a notecard that was created by a different person than that which created the first notecard.

8. A method of capturing textual content of notecards, the method comprising: receiving, from a digital imaging device, a digital image comprising a notecard, the notecard associated with a project status and comprising handwritten text, where the handwritten text relates to one or more aspects of a software development cycle; storing the digital image in a shared storage device as an image file; processing the digital image to improve the handwritten text present in the digital image; extracting the handwritten text from the digital image; saving the extracted handwritten text as a text file; associating the text file with the project status; and transmitting the text file and the associated project status to a collaboration and project management software application.

9. The method of claim 8, wherein the text file is saved according to the project status.

10. The method of claim 8, wherein the digital imaging device comprises a digital camera.

11. The method of claim 10, wherein an email client receives the digital image.

12. The method of claim 8, wherein processing the digital image to improve the handwritten text present in the digital image further comprises: aligning the digital image such that text content found in the digital image is oriented substantially in parallel with a boundary of the digital image; and converting the digital image into a black and white format.

13. The method of claim 12, further comprising processing the converted digital image to remove image imperfections.

14. The method of claim 13, wherein the image imperfections comprise shadows, reflections, glare, and out of focus portions.

15. The method of claim 8, wherein extracting the handwritten text from in the digital image comprises: transmitting the digital image to a text recognition application; and receiving a text file from the text recognition application that corresponds to the transmitted image.

16. A method of capturing textual content of handwritten notecards, the method comprising:
capturing an image of the handwritten notecard using a digital camera, the handwritten notecard associated with a project status;
emailing the captured image to an electronic mailbox;
extracting the captured image from the electronic mailbox and storing the extracted image in a shared storage device;
aligning the image such that textual content found in the image is oriented primarily parallel with regard to a boundary of the image;
converting the image into a black and white format;
processing the converted image to remove image imperfections;
storing the converted image in a storage format that differs from its original storage format;
converting the stored image into a text file comprising the textual content present in the image;
associating the text file with the project status; and
transmitting the text file and the associated project status to a collaboration and project management software application.

* * * * *